United States Patent [19]

Yang

[11] Patent Number: 4,940,759

[45] Date of Patent: Jul. 10, 1990

[54] PROCESS FOR MAKING FILM GRADE PVC

[75] Inventor: Yung-Chin Yang, Bay Village, Ohio

[73] Assignee: The B. F. Goodrich Company, Akron, Ohio

[21] Appl. No.: 325,629

[22] Filed: Mar. 20, 1989

Related U.S. Application Data

[63] Continuation of Ser. No. 904,428, Sep. 5, 1986.

[51] Int. Cl.$^5$ .............................................. C08F 2/20
[52] U.S. Cl. .................................... 526/62; 526/200; 526/202
[58] Field of Search ........................................... 526/62

[56] References Cited

U.S. PATENT DOCUMENTS

| 4,200,712 | 4/1980 | Cohen | 526/62 |
| 4,228,130 | 10/1980 | Cohen | 526/62 |
| 4,320,215 | 3/1982 | Yonezawa et al. | 526/62 |
| 4,324,878 | 4/1982 | Biaggi et al. | 526/200 |
| 4,345,056 | 8/1982 | Thyret et al. | 526/200 |
| 4,579,758 | 4/1986 | Dorsch et al. | 428/35 |

OTHER PUBLICATIONS

Chem Abstract 93, 115405y (Belgium 880425 Apr. 1, 1980).

Primary Examiner—Christopher Henderson
Attorney, Agent, or Firm—Daniel J. Hudak; Joe A. Powell

[57] ABSTRACT

Polyvinyl chloride resins and copolymers thereof are produced containing little or no gel content, commonly referred to as "fisheyes", even after numerous charges to a reaction vessel without cleaning thereof between charges. A primary dispersant system such as a high hydrolyzed polyvinyl acetate and an optional modified cellulose ether is utilized in association with a low hydrolyzed secondary dispersant, for example, polyvinyl acetate, in the reaction vessel such as a polymerizer containing an aromatic inhibitor polymer build-up compound coated on the internal walls thereof. The resin particles produced tend to have a uniform particle size and a high porosity so that plasticizers can readily be incorporated therein. Since contamination buildup on the reaction vessel walls is reduced or prevented, the amount of gel is reduced and production rate is increased since, as noted above, cleaning of the vessels is not required.

13 Claims, No Drawings

PROCESS FOR MAKING FILM GRADE PVC

CROSS-REFERENCE

This application is a continuation of application Ser. No. 06/904,429 filed Sept. 5, 1986, for "Process for Making Film Grade PVC", Yung-Chin Yang, Inventor.

FIELD OF THE INVENTION

The present invention relates to the production of film forming PVC resins and copolymers thereof by polymerizing vinyl chloride type monomers in a reaction vessel coated with an aromatic compound which inhibits polymer build-up by utilizing a primary dispersant system containing a high hydrolyzed polyvinyl acetate in combination with a secondary low hydrolyzed polyvinyl acetate dispersant.

BACKGROUND OF THE INVENTION

Heretofore, polyvinyl chloride (PVC) has typically been produced in large reaction vessels. A problem often encountered is a formation of gel during the polymerization of the resin. Gel can be reduced by thoroughly cleaning the reaction vessel periodically or after every production run. However, cleaning of the reaction vessels requires extensive down time and severely hinders the production rate of the resin.

It is known that the use of secondary dispersants enhance build-up on reactor walls which result in fisheyes in subsequent charges. Accordingly, the reactor must be periodically opened and cleaned.

U.S. Pat. No. 4,824,878 to Biaggi relates to a process for producing vinyl chloride polymer by polymerizing the monomer in an aqueous suspension in the presence of a free radical catalyst, a primary suspending agent to control the granulometric distribution of the particles of polyvinyl chloride obtained, as well as a secondary suspending agent consisting of partially hydrolyzed polyvinyl acetate having a saponification number between 520 and 600.

U.S. Pat. No. 4,345,056 to Thyret relates to a process for suspension polymerization of vinyl chloride employing mixed protective colloids such as polyvinyl acetate having a hydrolysis degree of 40 to 55 mole percent. With the remainder of the protective colloid mixture being a water soluble polyvinyl alcohol, an aminoethylhydroxypropyl cellulose and a vinyl acetate/vinyl pyrrolidone copolymer. The polyvinyl chloride produced allegedly has a low number of specks.

SUMMARY OF THE INVENTION

Generally, polymer build-up on the internal surface of a polymerization reactor is reduced in the production of polyvinyl chloride when an aromatic inhibitor compound is coated on the internal surface. However, in the production of film grade polyvinyl chloride resins, gel is often present in undesirable amounts. It has been found that the gel content of such resins can be substantially reduced when the polymerization reaction is carried out utilizing a primary dispersant system containing a 70 to a 98 mole percent hydrolyzed polyvinyl acetate and an optional modified cellulose ether in combination with a 10 to a 60 mole percent hydrolyzed secondary dispersant with the secondary dispersant being free of any compound which acts as a solvent with regard to the aromatic inhibitor compound. The present invention also provides a method to produce low gel content PVC resin with good powder properties (plasticizer dry up time, etc.) whereby multiple charges of the reaction vessel can be made without cleaning between charges.

In general, a process for producing a vinyl chloride type resin having a low gel content, comprises the steps of adding at least one vinyl chloride type monomer to a reaction vessel coated with an aromatic inhibitor polymer build up compound, adding to said vessel an effective amount of a primary dispersant system containing a 70 to a 98 mole percent hydrolyzed dispersant and an optional modified cellulose ether dispersant and adding an effective amount of a 10 to a 60 mole percent hydrolyzed secondary dispersant which is free from an organic solvent to produce a vinyl chloride resin having a low gel content upon polymerization, and polymerizing said vinyl chloride type monomer in said coated vessel.

DETAILED DESCRIPTION

Polyvinyl chloride resins according to the present invention are produced essentially free of gel, that is, containing low or nil gel content. In producing film grade polyvinyl chloride resins, it is very desirable to produce low or nil gel content. While the present invention is specifically illustrative with regard to the suspension polymerization of vinyl chloride, it may also be utilized with regard to copolymers thereof. Accordingly, examples of additional comonomers include other vinyl halides and vinylidene halides, such as vinyl bromide, vinylidene chloride etc., vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like: vinyl acetate esters of methacrylic acid such as methyl methacrylate, butyl methacrylate, and the like; styrene and styrene derivatives including alpha-methyl styrene, vinyl toluene, chlorostyrene vinyl naphthalene diolefins including butadiene, isoprene, chloroprene, and the like: and mixtures of any types of monomers and other Vinylidene monomers copolymerizable therewith; and other vinylidene monomers of the types known to the literature and to those skilled in the art.

The present invention however, is preferably applicable to the suspension polymerization of vinyl chloride, either alone or in a mixture with one or more other vinylidene monomers having at least one terminal $CH_2=C<$ grouping, copolymerizable therewith in amounts as great as about 80% or more by weight, based on the weight of the monomer mixture.

In the present invention, the polymerization process is usually conducted at a temperature in the range of about 0° C. to about 100° C. depending upon the particular monomer or monomers being polymerized However, it is preferred to employ temperatures in the range of about 40° C. to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more can be employed with some advantage with the more volatile monomers. Superatmospheric pressures can also be employed with those monomers having the requisite volatilities at reaction temperatures permitting reflux cooling of the reaction mixtures.

In order to generally prevent buildup in the reaction vessel, which can contaminate the vinyl monomer during polymerization thereof, an aromatic inhibitor polymer build-up compound, that is, an aromatic compound which inhibits polymer build-up in a reaction vessel is coated on the internal surfaces thereof. Application can be in any conventional manner as through spraying, brushing, and the like. One type of an aromatic inhibitor are various phenolic compounds such as self condensed or co-condensation products of phenols such as the self condensation or co-condensation product of phenol, resorcinol, hydroquinone, hydroxy hydroquinone, catechol, phloroglucinol and pyrogallol. Polyhydric naphthols such as 2,7-dihydroxy naphthalene, 8,7-dihydroxy naphthalene, 2,6-dihydroxy naphthalene, and the like may also be self condensed or co-condensed to make suitable phenolic compounds for use in this invention. Phenols such as those mentioned above may also be condensed with other materials such as amines. Suitable amines would include p-phenylenediamine and m-phenylenediamine that could be condensed with the phenols to give phenolic compounds suitable for use in this invention. Aromatic or aliphatic aldehydes such as benzaldehyde and formaldehyde may be condensed with phenols to give phenolic compounds suitable for use in this invention. For example, the condensation product of pyrogallol condensed with benzaldehyde is a suitable phenolic compound for use in this invention. The molecular weight of the phenolic compound is not limiting, however a preferred molecular weight would range from about 94 to about 3,000.

When these phenols are self condensed, or condensed with another phenol or with amines or aldehydes, there is more than one compound formed. Oligomers having different molecular weights are formed as well as oligomers having a different linkage. For example self condensed resorcinol gives both poly(oxyphenylene) and poly(hydroxyphenylene) products. The phenol compounds may be substituted with aliphatic, aromatic, halogen or other groups which do not replace all of the -OH groups.

Monomeric phenols also are suitable as the phenolic compounds of this invention. Examples of monomeric phenols are phenol, resorcinol, hydroquinone, hydroxy hydroquinone, catechol, phloroglucinol, pyrogallol and each of the above with substituents attached thereto such as aliphatic, aromatic or halogen groups. One or a mixture of two or more monomeric phenols may be used as the phenolic compounds of this invention.

The important criteria is that the phenolic compound for use in this invention have a functional phenolic (—OH) group and an aromatic backbone. One phenolic compound or a mixture of two or more phenolic compounds may be used together to form the phenolic compound of this invention.

The method of preparing condensed phenolic compounds is well known by those skilled in the art and is a relatively simple reaction. For example, self condensed resorcinol can be prepared by heating or cooking resorcinol in a reaction vessel under a nitrogen atmosphere for 8 hours at 300° C. withoug catalyst or for about 25 minutes at 300° C. by using a 25% molar NaOH catalyst. The condensation product of pyrogallol and benzaldehyde may be prepared by cooking in the presence of a mineral acid catalyst for 2 to 4 hours at 100° to 120° C.

The condensed phenolic compounds may be put into solution by dissolving in a weak caustic solution such as NaOH or NH4OH or an organic solvent such as methanol may be used. The aqueous solution is preferred.

This solution of condensed phenolic compounds is applied to the internal surfaces of the reactor vessel. The preferred method of application is by spraying. However, brushing, or by filling the reactor with water and thereby leaving a tightly adhering coating or film of the phenolic compound on the internal surfaces of the reactor is also a satisfactory method.

The phenolic coating may be very thin such as only a monolayer thick or a heavy coating. A thin coating may be obtained by spraying the phenolic compound on the interior surfaces of the reactor and then rinsing the surfaces with water. A thick coating is best obtained by using an organic solvent such as methanol and applying multiple coats. Thin coatings are preferred in this invention.

The phenolic coatings utilized are also described in U.S. Pat. Nos. 4,080,173 and 4,228,130 which are hereby fully incorporated by reference with regard to the various types of phenolic compounds, preparation thereof, and the like. The above various phenolic compounds are preferred as an aromatic inhibitor polymer build-up compound.

Another aromatic inhibitor polymer build-up compound is the various reaction products of a thiodiphenol, or a derivative thereof, with a bleaching agent or material, as for example sodium hypochlorite. These reaction products of thiodiphenols are thoroughly discussed in U.S. Pat. No. 4,297,820 as well as the preparation thereof and accordingly are hereby fully incorporated by reference. The thiodiphenols and derivatives thereof can be represented by the following generic formula:

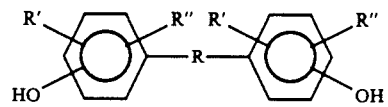

wherein R is —S—, or

R' is —H, —OH. or an alkyl group containing from 1 to 4 carbon atoms; and R" is —H or —Cl. Examples of compounds having said generic formula include 2,2'-thiodiphenol, 8,3'-thiodiphenol, 4,4'-thiodiphenol, 2,2'-dimethyl-4,4'-thiodiphenol, 3,3'-dimethyl-4,4'-thiodiphenol, and the like. The exact preparation and other aspects of these aromatic compounds are set forth in the incorporated patent and hence will not be repeated herein.

Another aromatic inhibitor polymer build-up compound which can be utilized to coat the reaction vessel is a polyaromatic amine dissolved in an aqueous acid solution. The types of polyaromatic amines, the preparation thereof, and the like are set forth in U.S. Pat. No. 4,255,470 which is hereby fully incorporated by reference. The polyaromatic amines have the following generic formula

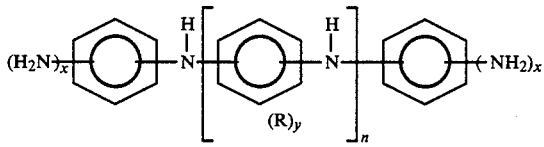

wherein R is H or $NH_2$, n is an integer from 0 to 5 and x and y are 1 or 2. Examples of the polyamino benzenes include the ortho-, meta-, and paraphenylene diamines and triamino benzenes. Branched polyaromatic amines are possible when triamino benzenes are employed. In addition to the self-condensation reaction, any two or more of the above amines can be reacted together or cocondensed.

The molecular weight or degree of condensation of the polyaromatic amine depends upon the time and temperature of heating, and the kind and concentration of the catalyst. When reacting two amines together, they are employed in approximately equal molar proportions. Polyaromatic amines having a molecular weight in the range of about 250 to about 1000 are satisfactory for use in the present invention. Suffice it to say that the particular polyaromatic amine should have a molecular weight such that it is workable and soluble in an aqueous acid solution so that it can be easily applied to the inner surfaces of the reactor. We have found that polyaromatic amines having a molecular weight in the range of about 300 to about 600 are preferred.

As set forth in the incorporated patent, various acid solutions can be utilized with HCl being the most effective acid.

To the various vinyl monomers charged to the reaction vessel is added a primary dispersant system which aids in suspending the monomers during the suspension polymerization. Additionally, a secondary dispersant is added which has been found to yield a more uniform or symetrical polyvinyl chloride particle or resin as well as to increase the porosity thereof. The dispersing agent in association with the aromatic inhibitor polymer build-up compound has been found to retard and to often eliminate polymer buildup on the walls of the reaction vessel thereby eliminating any need to remove the same. Typically, the reaction vessels may be utilized over and over without the requirement of interrupting the production cycle to clean out the reaction vessel.

The primary dispersants are at least partially water soluble and generally include hydrolyzed polyvinyl acetate and other similar dispersing agents. Hydrolysis of the polyvinyl acetate results in the replacement of many of the acetate groups by hydroxyl groups with each such replacement having a net result of converting a vinyl acetate monomer unit to a vinyl alcohol unit. The resulting product is generally characterized in terms of mole percent of hydrolysis. The level or degree of hydrolysis is thus the average mole percent of vinyl alcohol monomer units in the polymer.

The amount of hydrolysis of the hydrolyzed dispersant utilized in the primary dispersant system is from about 70 to about 98 mole percent and preferably from about 80 to about 90 mole percent. The degree of polymerization of the various polyvinyl acetate dispersants can vary from about 500 to about 3,000 with from about 1,000 to about 2,500 being preferred. Numerous polyvinyl acetate dispersant agents are commercially available as known to the art as well as to the literature. An example is Vinol 540 manufactured by Air products having a hydrolysis of 87 to about 89 mole percent.

In addition to the various polyvinyl acetate dispersants, in the primary dispersant system, partially substituted cellulose ethers can optionally be utilized, as for example, methyl cellulose, hydroxypropyl methyl cellulose, hydroxybutyl methyl cellulose, or hydroxypropy cellulose. The degree of substitution is within the range of from about 1.0 to about 8.0 with from about 1.5 to about 2.0 being preferred. The degree of polymerization can vary from about 50 to about 2,000 with from about 100 to about 150 being preferred. The amount of modified cellulose ether is from about to about 80% by weigh& and preferably from about 20% to about 60% by weight based upon the total weight of the primary dispersant system. Hence, the cellulose ethers are preferably utilized with a high hydrolyzed polyvinyl acetates in the primary dispersant system.

The hydrolysis reaction of polyvinyl acetate is typically carried out in a suitable solvent, for example, methanol, ethanol, methyl acetate, ethyl acetate, benzene acetone, and mixtures thereof with water, as described in "Polyvinyl Alcohol, Properties and Application", edited by C. A. Finch, John Wiley & Sons, (1973).

It is an important aspect of the present invention that the secondary dispersant be separated from organic solvents so that the aromatic inhibitor is not depleted, removed, or the function thereof interfered with during the polymerization of the various vinyl chloride type monomers. Thus, secondary dispersants are utilized which are generally free, that is, contain about 5% by weight or less, of organic solvents such as methanol, and the like. A suitable dispersant is a polyvinyl acetate having a low degree or level of hydrolysis, that is from about 10 to about 60 mole percent and preferably from about 20 to about 55 mole percent. Examples of such secondary polyvinyl acetate dispersants are well known to the art and to the literature. Specific examples of commercial compounds include Polyvic S202W manufactured by 3V Chemical and having a 47% level of hydrolysis, as well as Alcotex 55/002H having approximately a 55% level of hydrolysis. The degree of polymerization of the secondary polyvinyl acetate dispersant is generally from about 500 to about 3,000 with from about 1.000 to about 2,500 being preferred. Examples of other conventional polyvinyl acetate dispersants, both primary and secondary, are found in U.S. Pat. No. 4,283,516 which is hereby fully incorporated by references.

The amount or ratio of secondary dispersant utilized to the primary dispersant system is from about 0.2 to about 4.0 and preferably from about 0.5 to about 2.0. That is, with regard to the broad range, 4 parts by weight of one or more secondary dispersants can be utilized for every 1 part by weight of one or more primary stabilizers and as little as one part by weight of secondary dispersant can be utilized for every 5 parts by weight of primary dispersant.

The total amount of the primary and secondary dispersants is from about 0.05 to about 0.5 weight percent and preferably from about 0.08 to about 0.25 weight percent based upon the total weight of the various vinyl chloride-type monomers utilized. The net result is that film forming polyvinyl chloride resins can readily be produced containing very low or nil amounts of gel. That is, generally 10 particles or less of gel and preferably 5 particles or less of gel are produced.

The gel count was determined as follows: 100 parts of the PVC resin was mixed in a beaker with 50 parts of di-2-ethylhexyl phthalate plasticizer, 0.53 parts of calcium stearate and 0.83 parts of carbon black, and then milled at 144° C. on a two-roll mill. After 6 minutes, a film of about 0.18 millimeters in thickness was removed from the rolls and placed on a light box. The fisheyes, which appeared as bright spots in the films, were counted.

Numerous methods of preparation can be utilized such as the following: The reaction vessel is initially coated with an aromatic polymer build-up inhibitor compound as described above such as a phenolic compound, that is, self condensed or cocondensed phenols, naphthols, and the like; or a polyaromatic amine; or the reaction product of a thiodiphenol and a bleaching agent. Water and a vinyl chloride type monomer and any optional comonomers thereof are generally charged together to the coated reaction vessel. The temperature of the aqueous vinyl chloride solution is brought up to the reaction temperature. The primary and the solvent free secondary dispersants of the present invention are added thereto. Various conventional initiators known to the art as well as to the literature are then added to the reaction vessel in conventional amounts. Moreover, any other conventional vinyl chloride polymerization additives can be added as known to the art and to the literature. The reaction is then allowed to proceed until a desirable conversion of the monomers to form the polyvinyl chloride resin of the present invention was obtained. After the reaction is completed, the PVC is transferred, the reaction vessel is flashed with water, coated with an aromatic inhibitor compound, and then charged and the above process repeated.

The polyvinyl chloride resins of the present invention have also been found to be of a fairly uniform shape and size, and hence have good bulk density as a result of high packing ability. The resin also has good porosity and is therefore readily plasticizer to a high plasticizer capacity. The porosity also aids in fast plasticizer dry-up times. Additional advantages of the resin produced according to the present invention include fast powder mixing time, good flow rate, good compound flow, and good friability, that is, the ability of the grains to be broken down by a mechanical force. Since very little, if any, buildup is obtained in the reaction vessel, good production rated are achieved since the necessity of cleaning the reactor between charges is eliminated.

The polyvinyl chloride resins of the present invention are good film grade resins and hence find suitable use as flexible packaging material (for example, meat wrap) and profile extrusion (for example, refrigerator gaskets).

The invention will be better understood by reference to the following examples.

EXAMPLE I

TABLE I

| | The following formulations were prepared: | | | |
|---|---|---|---|---|
| | FORMULA 1 | FORMULA 2 | FORMULA 3 | FORMULA 4 |
| RECIPE | | | | |
| Vinyl Chloride (parts) | 100 | 100 | 100 | 100 |
| Water (phm) | 150 | 150 | 150 | 150 |
| Primary Dispersant 88% hydrolyzed polyvinyl acetate (phr) | 0.03 | 0.03 | 0.03 | 0.03 |
| Hydroxypropyl methylcelluose (phm) | 0.03 | 0.03 | 0.03 | 0.03 |
| Secondary dispersant (phm) | | | | |
| (1) | 0 | | | |
| (2) | | 0.1 | | |
| (3) | | | 0.1 | |
| (4) | | | | 0.1 |
| Di(2-ethyl-hexyl)peroxydicarbonate (phr) | 0.045 | 0.045 | 0.045 | 0.045 |
| REACTION CONDITIONS | | | | |
| Reactor Size (liters) | 3 | 3 | 3 | 3 |
| Temperature (°C.) | 53 | 53 | 53 | 53 |
| Conversion (%) | 80 | 80 | 80 | 80 |
| Agitation (RPM) | 600 | 600 | 600 | 600 |
| Reactor Coating (Chlorhydrinated Polyhydroxyphenol) | | | | |
| TEST RESULTS | | | | |
| Average Particle Size (um) | 116 | 116 | 164 | 168 |
| Porosity (Hg,cc/g) | 0.24 | 0.32 | 0.32 | 0.33 |
| Powder Mixing Time (Seconds) | 440 | 270 | 270 | 270 |
| Funnel Flow (Seconds) | 26 | 20 | 20 | 20 |
| Friability | Bad | Good | Good | Good |
| Reactor Build-Up (paper, sand) | 0.1/0.1 | 0.5/1.0 | 0.1/0.1 | 0.0/0.2 |

SECONDARY DISPERSANT

1. None
2. 48% hydrolyzed polyvinyl acetate in methanol solution (total solids 37%) methanol content 63%
3. 48% hydrolyzed polyvinyl acetate in aqueous solution (total solids 37%) methanol content <5%
4. 55% hydrolyzed polyvinyl acetate in aqueous solution (total solids 40%]methanol content <5%

Formulations 1 through 4 were prepared as follows: The reactor was coated with chlorhydrinated polyhydroxyphenol and flushed with water. The water and vinyl chloride were charged to the reaction vessel and the temperature brought up to 53° C. The primary dispersant system was then charged. The secondary dispersant was subsequently charged followed by charging of the initiator.

As apparent from Table I, Formula I which contained no low hydrolysis polyvinyl acetate secondary dispersant resulted in less reactor build-up but lower porosity, as measured by ASTM D2873-70 mercury intrusion, poorer funnel flow, as measured by modified ASTM D1895-69 method A using 140 grams of sample, and poorer powder mixing time, as measured by modified ASTM D2395-79 using 65 parts of mixed plasticizer per 100 parts of resin. Formula II which contained a secondary dispersant having a large amount (63%) of an organic solvent therein resulted in a higher porosity, better funnel flow time, and better powder mixing time, but in a heavy reactor build-up. In contract thereto, Formulas III and IV which were essentially solvent free, that is contained less than 5% by weight of an organic solvent, contained very negligible reactor build-up, good porosity, better funnel flow time, and better powder mixing time. It is noted that build-up is detrimental with regard to generating gel in a continuous charge (batches) operation.

EXAMPLE II

TABLE II

The following formulations were prepared:

| | FORMULA | | | | | |
|---|---|---|---|---|---|---|
| | 5 | 6 | 7 | 8 | 9 | 10 |
| RECIPE | | | | | | |
| Vinyl Chloride (parts) | 100 | 100 | 100 | 100 | 100 | 100 |
| Water (phm) | 140 | 140 | 140 | 140 | 140 | 140 |
| Primary Dispersants | | | | | | |
| 88% hydrolyzed polyvinyl acetate (phm) | 0.035 | 0.035 | 0.035 | 0.035 | 0.035 | 0.035 |
| Hydroxypropyl methyl cellulose (phm) | 0.04 | 0.04 | 0.04 | 0.04 | 0.04 | 0.04 |
| Secondary Dispersant (phm) | | | | | | |
| (2) | 0.06 | 0.06 | | | | |
| (3) | | | 0.06 | 0.06 | | |
| (4) | | | | | 0.07 | 0.07 |
| Di(sec-butyl peroxydicarbonate) (phm) | 0.03 | 0.03 | 0.03 | 0.03 | 0.03 | 0.03 |
| REACTION CONDITION | | | | | | |
| Reactor Size (18,600 gallons) Reactor Coating Chlorhydrinated Polyhydroxyphenol | | | | | | |
| Temperature (°C.) | 56 | 56 | 56 | 56 | 56 | 56 |
| Conversion (%) | 80 | 80 | 80 | 80 | 80 | 80 |
| Number of Continuous Charges | 1 | 5 | 1 | 13 | 1 | 42 |
| FISHEYES RESULTS | | | | | | |
| Fisheyes/36 Sq. in. | <5 | 40 | <5 | <5 | <5 | <5 |

Formulations 5 through 10 were prepared as follows:

The reactor was coated with chlorhydrinated polyhydroxyphenol and flushed with water. The water and the vinyl were charged to the reaction vessel and the temperature raised to about 56° C. The primary dispersants were then charged followed by the secondary dispersants. The initiator was charged last. After the reaction was completed and the slurry transferred, the reactor was flushed with water and coated with chlorhydrinated polyhydroxyphenol. Subsequent charges were added in the above noted manner.

Formulas 5 and 6 which utilized secondary dispersants containing methanol therein resulted in large amounts of gel after 5 continuous charged to the reactors. The build-up on the reactor was heavy. In contrast, formulas 7 through 10 which contained a secondary dispersant free from an organic solvent produced very low gel contents even after 40 continuous charges, and almost no build-up on the reactor walls was observed. Accordingly, the present invention produces resins having good porosity, powder mixing time, resin flow rate and friability.

While in accordance with the patent statutes a best mode and preferred embodiment has been set forth, the scope of the invention is not limited thereto, but rather by the scope of the attached claims.

What is claimed is:

1. A process for producing a vinyl chloride type resin having a low gel content, comprising the steps of:

adding at least one vinyl chloride type monomer charge to a reaction vessel coated with an aromatic inhibitor polymer build-up compound, adding to said vessel an effective amount of a primary dispersant system containing a 70 to a 98 mole percent hydrolyzed dispersant and a modified cellulose ether dispersant in an amount from 0% to about 80% by weight based upon the total weight of the primary dispersant system, and adding an effective amount of a 10 to a 60 mole percent hydrolyzed secondary dispersant which contains 5% by weight or less of an organic solvent to produce a vinyl chloride resin having a low gel content upon polymerization, polymerizing said vinyl chloride type monomer in said coated vessel to produce a low gel vinyl chloride type resin, and repeating said process at least 12 times and producing a low gel content vinyl chloride type resin under continuous production conditions free of cleaning said reaction vessel.

2. A process for producing vinyl chloride resins according to claim 1, wherein said vinyl chloride type monomer is vinyl chloride, or viny chloride and a comonomer thereof, and wherein the weight ratio of said secondary dispersant based upon said primary dispersant is from about 0.2 to about 4.0.

3. A process for producing vinyl chloride resins according to claim 2, wherein said aromatic inhibitor polymer build-up compound is a phenolic compound, a polyaromatic amine, or the reaction product of a thiodiphenol and a bleaching agent, wherein said phenol is the self condensed or co-condensation products of a phenol compound, or the self condensed or the co-condensation products of a naphthol compound, wherein said 70 to 98 mole percent hydrolyzed dispersant is a polyvinyl acetate having a degree of polymerization of from about 500 to about 3000, wherein said modified cellulose ether has a degree of substitution of from about 1.0 to about 3.0 and a degree of polymerization of from about 50 to about 2,000, and wherein said secondary dispersant is from about a 10 to about a 60 mole percent hydrolyzed polyvinyl acetate having a degree of polymerization of from about 500 to about 3,000.

4. A process for producing vinyl chloride resins according to claim 3, wherein the total amount of primary and secondary dispersants is from about 0.05 to about 0.5 weight percent based upon the total weight of said vinyl type monomers.

5. A process for producing vinyl chloride resins according to claim 4, wherein said primary dispersant system includes from about 20% to about 60% by weight of said modified cellulose ether based upon the total weight of said primary dispersant system, wherein said primary polyvinyl acetate dispersant is hydrolyzed from about 80 mole percent to about 90 mole percent, and wherein said secondary polyvinyl acetate dispersant is hydrolyzed from about 20 to about 55 mole percent.

6. A process for producing vinyl chloride resins according to claim 5, wherein said weight ratio of said secondary dispersant to said primary dispersant is from about 0.5 to about 1.5 and wherein the total amount of said primary and secondary dispersants is from about 0.08 to about 0.25 weight percent based upon the total weight of said vinyl type monomers.

7. A process for producing vinyl chloride resins according to claim 3, wherein said vinyl type monomers are vinyl chloride or vinyl chloride with one or more vinylidene comonomers having at least one terminal $CH=C<$ grouping, and wherein the number of repeated charges is at least 39.

8. A process for producing vinyl chloride resins according to claim 5, wherein said vinyl type monomers are vinyl chloride or vinyl chloride with one or more vinylidene comonomers having at least one terminal $CH=C<$ grouping.

9. A process for producing vinyl chloride resins according to claim 3, wherein said aromatic inhibitor compound is said phenolic compound.

10. A process for producing vinyl chloride resins according to claim 8, wherein said aromatic inhibitor compound is said phenolic compound.

11. A process for producing vinyl chloride resins according to claim 1, wherein the gel content of said resin produced under continuous conditions free from cleaning said reactor is 10 or less.

12. A process for producing vinyl chloride resins according to claim 9, wherein the gel content of said resin produced under continuous conditions free from cleaning said reactor is 5 or less.

13. A process for producing vinyl chloride resins according to claim 10, wherein the degree of polymerization of said primary polyvinyl acetate dispersant is from about 1,000 to about 2,500, and wherein the degree of polymerization of said secondary polyvinyl acetate dispersant is from about 1,000 to about 2,500.

* * * * *